United States Patent [19]

Heian

[11] 4,047,884

[45] Sept. 13, 1977

[54] MEANS AND METHOD FOR PROCESSING CEMENT RAW MATERIALS CONTAINING FUEL OF HIGH VOLATILE CONTENT

[75] Inventor: Glenn A. Heian, Franklin, Wis.

[73] Assignee: Allis-Chalmers Corporation, Milwaukee, Wis.

[21] Appl. No.: 674,062

[22] Filed: Apr. 5, 1976

[51] Int. Cl.² ............ F27D 7/04; C04B 7/04; C01B 17/96
[52] U.S. Cl. .................... 432/21; 106/102; 423/242; 432/72; 432/106
[58] Field of Search ............ 432/16, 21, 72, 106; 106/102, 100; 423/242

[56] References Cited

U.S. PATENT DOCUMENTS

| 284,178 | 9/1883 | Browne | 432/16 |
|---|---|---|---|
| 1,468,168 | 9/1923 | Pike | 432/106 |
| 1,932,467 | 10/1933 | Keenan | 432/90 |
| 2,732,062 | 5/1973 | Porteus | 432/16 |
| 3,920,380 | 11/1975 | Heian | 432/106 |
| 3,948,608 | 4/1976 | Weir, Jr. | 423/242 |
| 3,982,886 | 9/1976 | Christiansen | 432/106 |
| 3,986,819 | 10/1976 | Heian | 432/106 |

Primary Examiner—John J. Camby
Attorney, Agent, or Firm—Robert C. Jones

[57] ABSTRACT

A means and method for processing cement raw material containing fuel of high volatile content in a reinforced grate preheater kiln system by collecting the unburned volatiles of the high volatile fuel from the pellet bed and utilizing the collected volatiles as a fuel source elsewhere in the system.

9 Claims, 1 Drawing Figure

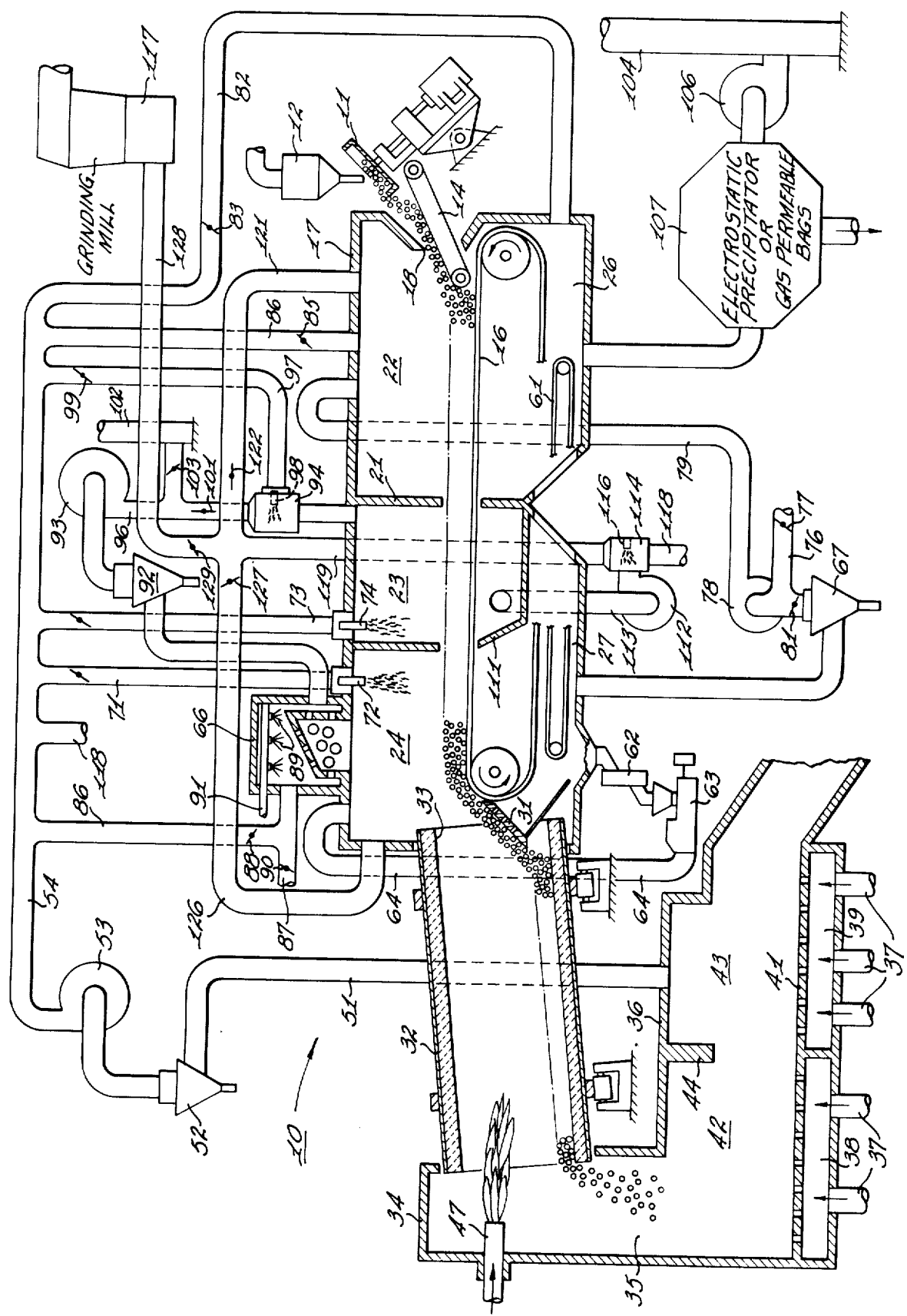

MEANS AND METHOD FOR PROCESSING CEMENT RAW MATERIALS CONTAINING FUEL OF HIGH VOLATILE CONTENT

BACKGROUND OF THE INVENTION

Cement raw material containing kerogen therein, such as oil shale or material having fuel with high amounts of volatiles, have not heretofore been processed successfully in suspension and grate preheater kiln systems. This is true because of the fact that the kerogen in the raw material produces a tremendous amount of unburned combustible volatiles that pass with the process gas. The grate preheater kiln system is not designed to handle these combustible gases and to efficiently recover their heat for use in the process or associated process. The present cost of fuel has made it economical to process cement raw materials containing kerogen or other high volatile fuels. Thus, cement raw materials such as is found in some of the western states of our nation can now be utilized since it is economical to process these materials.

Examples of systems which exemplify grate preheater kiln systems are disclosed in U.S. Pat. No. 2,925,336, issued to Stowasser; U.S. Pat. No. 3,110,483, issued to Baxa; U.S. Pat. No. 3,110,751, issued to Bade; U.S. Pat. No. 3,313,534, issued to Frans; and U.S. Pat. No. 3,653,645, issued to Heian et al. As disclosed in these patents, the problem in such systems is that of obtaining proper thermodynamic balance of heat inputs between the drying, preburning and final heating stages. This problem arises because for each material there are three requirements that establish desired temperatures within such systems. One requirement is that for each material there is an ascertainable BTU input and temperature level to which the material must be finally heated in the rotary kiln. A second requirement is that each material also has a known or ascertainable temperature level and total heat input that is necessary to achieve the desired preburn before the material is exposed to much higher temperatures in the kiln. A third requirement is that each material also has an ascertainable desirable maximum gas temperature for the drying stage so that water vapor is not produced so rapidly that the material being processed breaks into particle sizes so small that excessive dust is created.

The temperature of the gases that perform the final heating is a determining factor as to the temperature of the gases discharged from the kiln for preburning and drying material on the grate. Therefore, the degree to which the aforesaid first requirement is achieved affects the degree to which the second and third requirements can be achieved. Thus, the problem of proper thermodynamic balance between the drying, preburning and final heating stages is a continuous one because the gas flow begins with a specific volume of preheated gas from the cooler mixing with burning fuel in kiln to meet the first requirement.

Since thermodynamic balance, in systems of the type herein considered, is a continuing problem, any cement raw material which includes materials which introduce additional volatiles into the stages introduces factors which further affect the thermodynamic balance of heat inputs in the various stages of the system. Thus, kerogen containing cement raw materials has not heretofore been successfully processed in grate preheater kiln systems since the combustile volatiles from the kerogen materials has been too high for the systems to operate with. Another problem associated with cement raw material containing kerogen is the unusually high sulphur content. Thus, the gases from the processed material must also be treated to remove the sulphur from the waste gases.

The present invention is directed to the problem of processing kerogen containing cement raw material through a grate preheater kiln system, providing controlled thermodynamic balance in the system, and reducing the amount of external fuel requirements relative to the tonnage of material treated.

Still another object of the present invention is to provide a treating method to process sulphur-laden gas given off by kerogen materials contained in cement raw materials to prevent discharge of excessive sulphur into the atmosphere.

SUMMARY OF THE INVENTION

According to the present invention, a wind box (suction) chamber within the preheat wind box chamber is disposed in the zone where most of the noncombusted volatiles come out of the pellet bed. The gas goes to a fan and is introduced into a combustion chamber where the gas may or may not be combusted according to system demand. A system demand for external fuel either in the kiln or in the preheat zone will result in combusted or noncombusted gases from the combustion chamber being introduced into the preheat zone as auxiliary heat or fuel relieving the demand for external fuel.

In a modification of the invention, two or more combustion chambers may be provided so that one combustion chamber will burn the gas and the combusted gases can be used for supplemental drying heat in the grate preheater, as drying heat in a grinding mill circuit, or as drying heat in a raw material dryer. The gases in the other combustion chamber will be directed combusted or without being combusted to the preheat zone to be burned therein for heat to supplement or replace heat in the grate preheat chamber or zone.

In the drawing there is shown a diagrammatical view, partly in section and partly in elevation, of a material treating system of the grate kiln for performing the process of treating cement raw material containing kerogen or high volatile material therein.

DESCRIPTION OF THE INVENTION

Referring to the drawing, cement raw material containing kerogen is supplied to the system 10 by a suitable agglomerating device such as a power-driven rotary pelletizing pan 11 that is fed from a hopper 12. The raw green pellets are deposited on a feeder 14 which feeds the pellets to a gas-pervious traveling grate 16 which is driven by a suitable power source (not shown). A housing structure 17 is constructed and arranged to enclose a space over the grate 16 and defines an inlet opening 18 through which the feeder 14 extends to convey the raw pellets to the grate 16. A baffle wall 21 is suspended from the roof of housing 17 to a predetermined distance above the grate 16 and operates to divide the space enclosed by the housing 17 into a material preconditioning or drying zone or chamber 22 and a series of preconditioning or preheat zones or chambers 23 and 24. A negative-pressure wind box 26 below the drying zone 22 is provided. Similarly, a negative-pressure wind box 27 is provided below the series of preheat zones 23 and 24. Green pellets containing kerogen material will be deposited as a bed of material on the grate 16 and will be transported through the drying zone 22, then through the preheat zones 23 and 24, and thence be discharged down a chute 31 into a refractory-lined rotary kiln 32 through an inlet opening 33 therein.

The rotary kiln 32 slops downwardly from chute 31 toward a hood 34 that encloses the lower discharge end of the kiln 32 and defines a passage 35 from the kiln to a cooler 36. The downward slope of the rotary kiln 32 causes material received from the chute 31 to pass through the kiln and into the hood 34 and thence through passage 35 into the cooler 36, which may be a device as shown in U.S. Pat. No. 2,256,017.

The cooler 36 is provided with blowers (not shown) that blow controlled quantities of air through suitably connected ducts 37 upwardly through wind boxes 38, 39 and through material on an air-pervious grate 41. The cooler 36 may be divided into a primary cooling zone 42 and a secondary cooling zone 43 by means of a depending baffle 44. The cool air is blown upwardly through the wind boxes 38 and 39 and into the passage 35 and into the firing hood 34. A burner 47 is mounted on and projects into the interior of the hood 34 to deliver and burn fuel that operates to raise the temperature of gases passing into the kiln 32 from the firing hood to the desired high temperature level of 2500°–2900° F required for the cement material receiving heat treatment in the kiln. Gas flow input from the inlet end 33 of kiln 32 that passes into the preheat zone 24 will be in a temperature range of 1200°–2400° F.

The waste off-gases from the cooler 36 are recouped and utilized in the drying zone 22 and in both of the preheat zones 23 and 24. To this end, the cooler off-gases from the final zone 43 of the cooler 36 are drawn into an exhaust duct 51 which is connected to a mechanical cyclone duct collector 52. A fan 53 connected between the duct collector 52 and a supply duct 54 operates to pass the gases into the supply duct for subsequent utilization.

The kiln off-gases to preheat zone 24 can be very high in sulfur and alkalies with gaseous sulfur exceeding the level that can react with or tie-up with alkalies. Thus an excess of gaseous sulfur in the gas from preheat zone 24 conventionally bypassed to the drying chamber 22 or to the waste stack exists and presents a problem since present environmental standards prescribe maximum sulfur in waste or stack gases. Thus, an efficient means must be provided to reduce the sulfur in the waste gas to stack. With the conventional bypass, the potential of the sulfur going through the drying bed in the drying zone 22 and through a waste dust collector is great. Also, when the preheat on-gas contains large amounts of sulfur, a substantial internal sulfur cycle develops which will prevent the desired reduction of sulfur in the kiln product.

To alleviate the sulfur problems, the high sulfur gases to the preheat zone 24 are treated with a material which is chemically reactive with sulfur, such as lime bearing dust. The lime bearing dust can be material collected from wind boxes 26 and 27 under the drying zone 22 and the preheat zones 23 and 24. Included in these collected materials are the pellets and fines which back-spill from chute 31.

Sulfur oxides have a strong affinity for free lime at temperatures generally about 500° and up to 2200° F and readily form gypsum anhydrite. The gypsum anhydrite that is formed in the calcined material bed is processed through the kiln 32. The high lime bearing material from the wind boxes 26 and 27 is recycled and blown into the kiln off-gas stream to add lime bearing fines with which the sulfur in the kiln off-gas will combine and can be removed.

To this end, the lime bearing material from the preheat zone 24 and also from the preheat zone 23 and the drying zone 22 which pass through the traveling grate 16 are collected on a lower conveyor 61 and the pellets and fines are passed to a pulverizer 62 and thence to an elevating device, such as a pneumatic pump 63. The collected and pulverated dust from the pump 63 is directed back to the preheat zone 24 via a duct 64 and is dropped in a substantially transverse vertical path into the up-sweeping kiln off-gas stream flowing into a bypass mixing box 66. Thus, the recycled lime bearing dust has a better potential for being more completely calcined and thus be reactive with the sulfur in the kiln off-gases. A portion of this calcined dust will pass through a material bed on the grate 16 and will be pulled out by a cyclone separator 67 in the form of gypsum anhydrite.

Gas which is relatively free of sulfur is obtained from the cooler 36 via the connected duct 51. As previously mentioned, this gas is passed through a mechanical dust collector 52 wherein the larger dust particles are removed from the gas. The fan 53 draws the gas from the collector 52 and forces the gas through the duct 54. This relatively sulfur-free gas is passed via duct 71 to a burner 72 connected into the preheat or preburn zone 24 to supply the necessary combustion air to burner 72 which controls preheating and calcining of the bed material as well as for effecting the forming of gypsum anhydrite.

Another duct 73 connected between supply duct 54 and a burner 74 is connected to preheat or preburn zone 23 to supply the necessary combustion air to burner 74 which initiates preheating and calcining of the bed material as well as for effecting the forming of gypsum anhydrite. Still another portion of the sulfur-free gas is utilized in the drying zone 22.

The preheat off-gas that is also delivered to the drying zone 22 might be too hot for the drying zone and thus must be cooled. To this end, bleed-in air from a duct 76 is utilized as tempering air for the relatively hot preheat off-gases. Duct 76 also includes a damper 77 which is operative to permit a controlled flow of tempering air. The wind box off-gases are passed through cyclone dust collector 67 and thence are passed via a fan 78 and a duct 79 to the drying zone 22. A regulating damper 81 is operable to control the volume of the wind box off-gases entering the drying zone 22. Thus, the off-gas from preheat zones 23 and 24 entering the drying zone 22 is tempered by ambient air to establish a drying atmosphere of 700° F or below.

A duct 82 connected to the supply duct 54 communicates with the drying wind box 26 under drying zone 22. A damper 83 operates to control the pressure in the supply duct 54 dumping excess gases into the drying wind box 26. This stabilizes the flow of gases through the supply duct 54 and thereby stabilizes the operation of the cooler recoup fan 53.

A portion of the kiln off-gas in the preheat zone 24 which contains a substantial amount of reacted and calcined dust from duct 64 is drawn into the ported cage mixing box 66 and mixed with a controlled volume of cooler off-gases from duct 86 or ambient tempering air from duct 87 that are directed into the mixing box. To control the quantity of the cooler off-gases that are directed to the mixing box 66, a damper 88 is operatively disposed within the duct 86. Duct 87 also includes a damper 90 which is operative to admit a flow of tempering air into the mixing box 66 as required. The mixing gases in the mixing box 66 are moisturized as required by means of sprays 89 which are a part of a water system 91.

The now reacted calcined dust, added via the duct 64 and which is substantially free lime, is mixed in the mixing box 66. Since sulfur oxides have a strong affinity for free lime at temperatures between 500° and 2200° F, they react with the dust in the mixed gases in the mixing box 66 and form gypsum anhydrite which is a potential usuable by-product. Thus, the gases from the mixing box 66 are passed through a dust collector 92 where the gypsum anhydrite dust particles are collected from the gas.

The relatively clean gases are drawn from the dust collector 92 by a fan 93 and directed into an air heater 94 via an interconnecting duct 96. Within the air heater 94 the gases from the mixing box 66 are reheated. A controlled quantity of cooler off-gases obtained from the supply duct 54 via an interconnecting duct 97 are supplied as relatively sulfur-free combustion air to the air heater burner 98. The quantity of the cooler off-gases that are supplied to the air heater 94 is controlled by a damper 99. The volume of the bypass gases to the air heater 94 is controlled by a damper 101. Thus, the temperature of the mixture of bypass mixing box gases is raised to a suitable level before it is passed to the preheat zone 23.

The bypass gases, when not utilized in the preheat zone 23, are directed to the stack 102. This is accomplished by opening damper 103 and closing damper 101. On the other hand, the gases in the negative pressure wind box side 26 of the drying zone 22 are waste gases which are disposed of through a stack 104. A fan 106 draws there waste gases through an electrostatic precipitator or gas permeable bags 107.

As previously mentioned, the cement raw material being treated in the system 10 contains a high percentage of kerogen material. As the raw pelletized materials on the grate 16 pass through the drying zone 22 and preheat zones 23 and 24 the available oxygen, in burning some of the fuel passing through the pellet bed, is consumed. As a result, the noncombusted kerogen materials passing through the pellet bed must be disposed of for safety, environmental and economical purposes. That is, the noncombusted kerogens, if not disposed of, could result in an accumulation of an explosive mixture within the system. Also, wasting the noncombusted kerogen material to the stack is totally unacceptable environmentally. Finally, the noncombusted kerogen materials represent a high potential heat source which can be utilized to materially reduce the amount of external fuel that the system requires.

To this purpose, a collector wind box 111 is provided within the preheat negative-pressure wind box 27. The collector wind box 111 is located below the traveling grate 16 and in position to collect the noncombusted volatiles which, in the absence of oxygen, pass through pellet bed on grate 16. This is possible because consumption of the available process gas oxygen in burning some of the fuel passing through the pellet bed results in the remaining volatilized fuel coming out of the bed in a noncombusted state due to the absence of oxygen. The noncombusted volatilized fuel comes off in a defined area of the preheater zone defined by the preheat zone 23 and pass through the bed into the collector wind box 111.

The noncombusted volatiles collected in the wind box 111 are available for utilization in the system. To this purpose, a fan 112 connected to the wind box 111 by a duct 113 draws the noncombusted volatiles from the wind box 111 and passes the gases into a combustion chamber 114 which includes a burner 116.

Depending upon system requirements, the noncombusted volatiles may be used as a source of fuel for the high temperature grate preheat zones 23 and 24; or, as a source of low temperature heat to the drying zone 22. The noncombusted volatiles may also be used as a source of heat for devices external of the system 10 as, for example, a grinding mill 117.

Utilization of the noncombusted volatiles as a source of relatively low temperature heat to the drying zone 22 is accomplished by combusting the volatiles in the combustion chamber 114. Combustion air for the combustion chamber 114 is obtained from the cooler recoup supply duct 54 or a connected duct 118. The combusted gases from the combustion chamber 114 are directed via a duct 119 into a drying chamber duct 121 connected into the drying zone or chamber 22 and there used as heat for the pellet bed moving through drying zone 22. A damper 122 in duct 121 regulates the supply of heat that is delivered to the drying zone or chamber 22.

On the other hand, noncombusted volatiles from the collector wind box 111 may be directed, in the combusted or noncombusted state, to the preheat zones 23 and 24. The introduction of noncombusted volatiles to the preheat zone can be utilized as fuel to consume the process gas oxygen to the bed in the volitalization zone to further concentrate the noncombusted volatiles. Conversely, the burning of as much of the fuel in the bed as possible can be enhanced by burning with oxygen rich process gas or cooler recouped gases.

For the purpose of utilizing the noncombusted volatiles in the preheat zone, the noncombusted volatiles are passed through the combustion chamber 114 without being combusted and, by means of duct 119, pass into a supply duct 126. These noncombusted volatiles directed into the preheat zone 24 through connecting duct 126 are controlled by a damper 127. The noncombusted volatiles introduced into the preheat zone 24 via duct 126 are combusted with oxygen rich air or preferably cooler recouped air supplied from the cooler recoup supply duct 54 via duct 71. The noncombusted volatiles are particularly useful in this manner when the kiln off-gases to the preheat zone are high in sulphur and alkalies, with the gaseous sulphur exceeding the level that can react or tie up with alkalies.

By treating the sulphur gases with lime-bearing duct which is chemically reactive with sulphur the sulphur problem is alleviated. Lime-bearing dust is material collected from the drying zones and preheat zones previously described. Thus, the recycled dust is subjected to the additional heat provided by the noncombusted volatiles directed into the preheat zone to effect a substantial calcining of the dust which then is reactive with the sulphur in the kiln off-gases. It is apparent that a considerable savings in external fuel for treating the sulphur in the kiln off-gases is effected in the ability to utilize the noncombusted volatiles recovered from the material being treated as taught herein.

Still another use for the collected noncombusted volatiles is the use thereof as heat for auxiliary external equipment such as the grinding mill 117. To this purpose, the noncombusted volatiles are combusted in the combustion chamber 114 and then are directed via duct 119 into a duct 128 which is operably connected to provide the source of heat to the grinder mill equipment 117 as may be required. A damper 129 controls the heat provided to the mill.

The embodiments of the invention in which an exclusive property or privilege is claimed are defined as follows:

1. In a method of processing raw cement material containing fuel of high volatile content in which the material is progressed through a drying zone and at least one preheat zone each of different temperatures and for a specific function wherein the temperature in the preheat zone is between 1200° F and 2400° F; comprising the steps of:
   A. collecting the noncombusted volatiles from a collector in the windbox below the material bed in preheat zone;
   B. combusting the collected volatiles of Step A in a combustion chamber; and,
   C. passing the combusted volatiles as heat back to said preheat zones wherein preheating and calcining of the material being processed is effected.

2. In a method of processing raw cement material containing fuel of high volatile content according to claim 1 wherein the combusted volatiles of Step B are passed as heat to the drying zone at a controlled temperature below 700° F.

3. In a method of processing raw cement material containing fuel of high volatile content in which the material is progressed through a drying zone and at least one preheat zone each of different temperatures and for a specific function wherein the temperature in one of the preheat zones is between 1200° F and 2400° F; comprising the steps of:
   A. collecting the noncombusted volatiles from the preheat zone;
   B. passing the noncombusted volatiles to a combustion chamber to combust the volatiles;
   C. supplying ambient air to the combustion chamber as combustion air; and,
   D. passing the combusted volatiles as heat from the combustion chamber to the preheat zone from whence the noncombusted volatiles where collected to thereby reduce the amount of external heat required in the preheat zone.

4. In a method of processing raw cement material according to claim 3 wherein the air supplied to the combustion chamber is cooler recouped air.

5. In a method of processing raw cement material containing fuel of high volatile content in which the material is progressed through a drying zone and at least one preheat zone each of different temperatures and for a specific function wherein the temperature in the preheat zones is between 1200° F and 2400° F; comprising the steps of:
   A. collecting the noncombusted volatiles from the preheat zone;
   B. combusting the collected volatiles of Step A in a combustion chamber;
   C. adding combustion air to the combustion chamber; and,
   D. passing the combusted volatiles as heat to an external device to effect a reduction in the amount of external fuel used in the device.

6. In a method of processing raw materials having a high sulphur content and containing fuel of high volatile content in a material treating furnace arrangement in which a stream of the material is progressed by grate means through a drying zone and a preheat zone having an oxygen atmosphere only sufficient to effect combustion of some of the fuel in the material being processed and having a bypass, a kiln and a cooling zone, and also having a double-pass fan system which pulls gases from the preheat zone through the pellet bed on the grate and delivers the gases to the drying zone as drying heat, comprising the steps of:
   A. directing sulphur-laden kiln off-gases into the preheat zone;
   B. adding a quantity of material which is chemically reactive with sulphur to the sulphur-laden kiln off-gases moving into the bypass system in the preheat zone to mix with the sulphur-laden kiln off-gases to chemically react to form a solid sulphur compound in dust form which moves with the gas stream;
   C. collecting a substantial amount of the sulphur-containing dust in a bypass dust collector;
   D. adding cooler recoup gases as combustion air into the combustion chamber to enrich the oxygen content of the gas stream into the preheat zone to enhance the burning of the fuel in the material bed within the preheat zone;
   E. collecting the noncombusted volatiles from the preheat zone; and,
   F. adding the noncombusted volatiles into the preheat zone to control the temperature therein and reduce the amount of external fuel requirement.

7. In a furnacing apparatus having structures defining at least a chamber for preconditioning material and having a material inlet, a chamber for preheating material, a chamber for final heating material having a material inlet adjacent the preheat chamber, and a cooler for receiving material from the final heating chamber, said chambers being connected together in series flow arrangement to define a material flow stream from the preconditioning chamber to the final heating chamber, the structures defining a passage for a counterflow of gas from the final heating chamber to the preheat chamber and gas conveying means connecting the preheat chamber to the preconditioning chamber, said gas conveying means comprising:
   a collecting chamber operatively disposed to collect noncombusted volatiles from the preheat chamber;
   a combustion chamber operatively connected to receive the noncombusted volatiles from said collecting chamber;
   combustion means in said combustion chamber to convert the noncombusted volatiles to heat;
   means operatively connected between the cooler and said combustion chamber for directing recoup cooler gases as combustion air to said combustion means; and,
   means operably connected between said combustion chamber and the preconditioning chamber to transmit the heat to said preconditioning chamber for material preconditioning.

8. In a furnacing apparatus having structures defining at least a chamber for preconditioning material and having a material inlet, a chamber for preheating material, a chamber for final heating material having a material inlet adjacent the preheat chamber, said chambers being connected together in series flow arrangement to define a material flow stream from the preconditioning chamber to the final heating chamber, the structures defining a passage for counterflow of gas from the final heating chamber to the preheat chamber and gas conveying means connecting the preheat chamber to the preconditioning chamber, said gas conveying means comprising:
- a collecting chamber within the preheat chamber and operatively disposed below the material flow stream in position to collect noncombusted volatiles that pass through the material flow stream;
- a combustion chamber including combustion means therein operably connected to receive noncombusted volatiles from said collecting chamber, said combustion means in said combustion chamber being operable to convert the noncombusted volatiles to heat; and,
- heat conducting means operably interconnected between said combustion chamber and the preconditioning chamber to direct heat to the preconditioning chamber for effecting drying of material in the preconditioning chamber.

9. In a furnacing apparatus having structures defining at least a chamber for preconditioning material and having a material inlet, a chamber for preheating material, a chamber for final heating material having a material inlet adjacent the preheat chamber, said chambers being connected together in series flow arrangement to define a material flow stream from the preconditioning chamber to the final heating chamber, the structures defining a passage for a counterflow of gas from the final heating chamber to the preheat chamber and gas conveying means connecting the preheat chamber to the preconditioning chamber, said gas conveying means comprising:
- a collecting chamber operatively connected to collect noncombusted volatiles from the preheat chamber;
- a combustion chamber operatively connected to receive the noncombusted volatiles from said collecting chamber;
- combustion means in said combustion chamber to convert the noncombusted volatiles to heat; and,
- duct means operably connected to receive heat from said combustion chamber and to direct the heat to a device external of the furnacing apparatus.

* * * * *